United States Patent
Zhang et al.

(10) Patent No.: US 10,476,714 B2
(45) Date of Patent: Nov. 12, 2019

(54) RADIO-NETWORK NODE, WIRELESS DEVICE AND METHODS PERFORMED THEREIN

(71) Applicant: Telefonaktiebolaget LM Ericsson (publ), Stockholm (SE)

(72) Inventors: Qiang Zhang, Täby (SE); Håkan Andersson, Linköping (SE); Mattias Frenne, Uppsala (SE); Johan Furuskog, Stockholm (SE); Niclas Wiberg, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/527,750

(22) PCT Filed: Mar. 31, 2017

(86) PCT No.: PCT/SE2017/050314
§ 371 (c)(1),
(2) Date: May 18, 2017

(87) PCT Pub. No.: WO2017/176194
PCT Pub. Date: Oct. 12, 2017

(65) Prior Publication Data
US 2018/0375698 A1  Dec. 27, 2018

Related U.S. Application Data

(60) Provisional application No. 62/319,313, filed on Apr. 7, 2016.

(51) Int. Cl.
*H04L 27/00* (2006.01)
*H04W 74/00* (2009.01)
(Continued)

(52) U.S. Cl.
CPC ....... *H04L 27/0014* (2013.01); *H04W 74/006* (2013.01); *H04L 5/0053* (2013.01); *H04L 2027/0095* (2013.01); *H04W 36/165* (2013.01)

(58) Field of Classification Search
CPC . H04L 5/0053; H04L 1/0007; H04L 27/2602; H04L 2027/0095; H04L 27/0014;
(Continued)

(56) References Cited

U.S. PATENT DOCUMENTS

2007/0127923 A1* 6/2007 Dalton ............... H04B 10/27
398/71
2007/0189237 A1* 8/2007 Jaatinen ............ H04B 7/2656
370/335
(Continued)

FOREIGN PATENT DOCUMENTS

WO  2015144208 A1  10/2015
WO  2016045341 A1  3/2016

*Primary Examiner* — Emmanuel Bayard
(74) *Attorney, Agent, or Firm* — Murphy, Bilak & Homiller, PLLC

(57) ABSTRACT

Embodiments herein relate to a method performed by a radio-network node (12) for handling access to the radio-network node (12) from a wireless device (10) in the wireless communication network (1). The radio-network node determines one or more preamble configuration parameters indicating a length of a preamble for a physical random-access channel, PRACH, for the wireless device (10) based on one or more signal strength or quality measurements, and/or a load in the wireless communication network (1). The radio network node further transmits an indication of the determined one or more preamble configuration parameters to the wireless device.

20 Claims, 12 Drawing Sheets

(51) Int. Cl.
*H04L 5/00* (2006.01)
*H04W 36/16* (2009.01)

(58) Field of Classification Search
CPC . H04W 74/00; H04W 36/0077; H04W 36/14; H04W 36/165
USPC .................................................. 375/260, 295
See application file for complete search history.

(56) References Cited

U.S. PATENT DOCUMENTS

| | | | |
|---|---|---|---|
| 2007/0211671 A1* | 9/2007 | Cha | H04B 7/2637 370/335 |
| 2010/0210255 A1* | 8/2010 | Amirijoo | H04W 74/002 455/419 |
| 2010/0265900 A1* | 10/2010 | Baldemair | H04W 52/10 370/329 |
| 2011/0039499 A1 | 2/2011 | Zhang et al. | |
| 2011/0098035 A1 | 4/2011 | Frenger et al. | |
| 2011/0165874 A1* | 7/2011 | Amirijoo | H04W 74/0866 455/434 |
| 2011/0194483 A1* | 8/2011 | Ji | H04W 36/0033 370/315 |
| 2011/0211513 A1* | 9/2011 | Coleri Eregen | H04W 52/0274 370/311 |
| 2011/0235529 A1* | 9/2011 | Zetterberg | H04L 5/0053 370/248 |
| 2012/0243584 A1* | 9/2012 | Honda | H04B 7/0811 375/219 |
| 2012/0289178 A1* | 11/2012 | Matsumura | H04W 52/0206 455/403 |
| 2013/0329711 A1* | 12/2013 | Seo | H04J 11/0069 370/336 |
| 2014/0185483 A1* | 7/2014 | Kim | H04W 24/02 370/252 |
| 2014/0328309 A1* | 11/2014 | Comstock | H04W 72/082 370/329 |
| 2015/0036567 A1* | 2/2015 | Park | H04L 27/2613 370/311 |
| 2015/0036696 A1* | 2/2015 | Nishikawa | H04L 27/2613 370/476 |
| 2015/0098345 A1* | 4/2015 | Ekbatani | H04L 25/024 370/252 |
| 2015/0156760 A1* | 6/2015 | Yu | H04W 72/042 370/330 |
| 2016/0241314 A1* | 8/2016 | Ferrante | H04W 72/0406 |
| 2017/0188368 A1* | 6/2017 | Cariou | H04L 61/6022 |
| 2017/0245307 A1 | 8/2017 | Liu et al. | |
| 2018/0097590 A1* | 4/2018 | Ly | H04L 5/0023 |
| 2018/0145802 A1* | 5/2018 | Hwang | H04L 5/00 |
| 2018/0242367 A1* | 8/2018 | Kim | H04W 72/04 |
| 2018/0316474 A1* | 11/2018 | Mukherjee | H04W 72/042 |

\* cited by examiner

Fig. 5. Wireless device is connected to 5G eNB

Fig. 6. 5G Initial Access with LTE dual connectivity

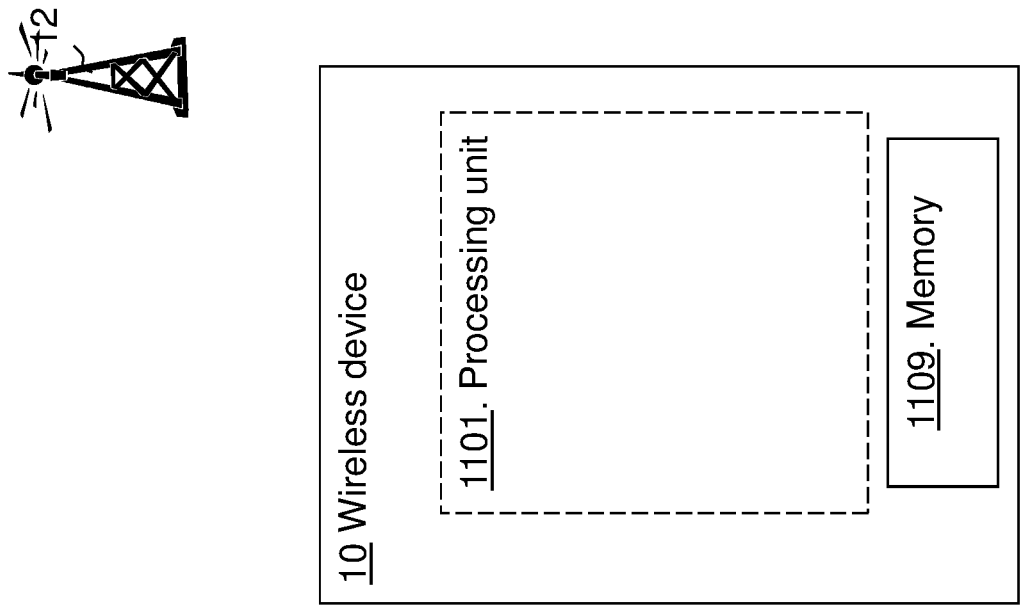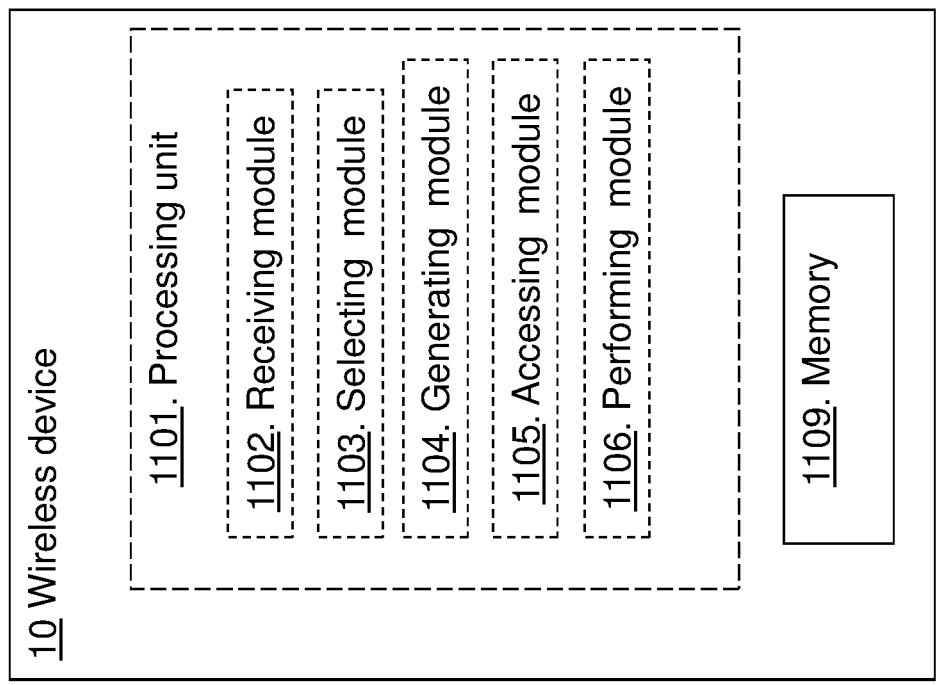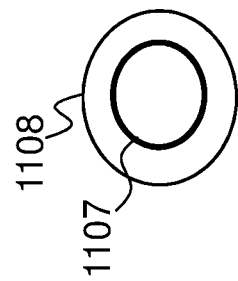
Fig. 11

RADIO-NETWORK NODE, WIRELESS DEVICE AND METHODS PERFORMED THEREIN

TECHNICAL FIELD

Embodiments herein relate to a radio-network node, a wireless device and methods performed therein. Furthermore, a computer program and a computer-readable storage medium are also provided herein. In particular, embodiments herein relate to handling access to the radio-network node from the wireless device in a wireless communication network.

BACKGROUND

In a typical wireless communication network, wireless devices, also known as wireless communication devices, mobile stations, stations (STA) and/or user equipments (UE), communicate via a Radio Access Network (RAN) with one or more core networks (CN). The RAN covers a geographical area which is divided into service areas or cell areas, which may also be referred to as a beam or a beam group, with each service area or cell area being served by a radio-network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio-network node. The radio-network node communicates over an air interface operating on radio frequencies with the wireless device within range of the radio-network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio-network nodes may be connected, e.g., by landlines or microwave, to a controller node, such as a radio-network controller (RNC) or a base station controller (BSC), which supervises and coordinates various activities of the plural radio-network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3$^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio-network nodes are directly connected to the EPC core network rather than to RNCs. In general, in E-UTRAN/LTE the functions of an RNC are distributed between the radio-network nodes, e.g. eNodeBs in LTE, and the core network. As such, the RAN of an EPS has an essentially "flat" architecture comprising radio-network nodes connected directly to one or more core networks, i.e. they are not connected to RNCs. To compensate for that, the E-UTRAN specification defines a direct interface between the radio-network nodes, this interface being denoted the X2 interface. EPS is the Evolved 3GPP Packet Switched Domain.

Advanced Antenna Systems (AASs) is an area where technology has advanced significantly in recent years and where we also foresee a rapid technology development in the years to come. Hence it is natural to assume that AASs in general and massive Multiple Input Multiple Output (MIMO) transmission and reception in particular will be a cornerstone in a future Fifth Generation (5G) system.

In relation to the AAS, beam-forming is becoming increasingly popular and capable and it is not only for transmission of data but also for transmission of control information. This is one motivation behind the control channel in LTE known as Enhanced Physical Downlink Control Channel (ePDCCH). When the control channel is beam-formed, the cost of transmitting the overhead control information can be reduced due to the increased link budget provided by the additional antenna gain.

Automatic repeat-request (ARQ) is an error-control technique used in many wireless networks. With ARQ, a receiver of data transmissions sends acknowledgements (ACKs) or negative acknowledgments (NACKs) to inform the transmitter of whether each message has been correctly received. Incorrectly received messages, as well as messages that aren't acknowledged at all, can then be re-transmitted.

Hybrid ARQ (HARQ) combines ARQ with forward error-correction (FEC) coding of the data messages, to improve the ability of the receiver to receive and correctly decode the transmitted messages. As with conventional ARQ, receivers employing HARQ send ACKs and NACKs, as appropriate, after each attempt to decode a message. These ACKs and NACKs are referred to as "HARQ feedback."

For downlink HARQ transmissions in LTE today, HARQ feedback is sent from the wireless device, e.g. a User Equipment (UE) to the Network (NW) on either Physical Uplink Control Channel (PUCCH) or Physical Uplink Shared Channel (PUSCH), depending on whether the wireless device has been scheduled for uplink PUSCH transmission or not. The NW can thereafter, on an individual HARQ process basis, draw conclusions on whether the last HARQ reception for that process was successful or not, based on received ACK or NACK, or even if the Downlink (DL) Assignment reception failed, i.e. the wireless device does not send any feedback also called Discontinuous Transmission (DTX).

When accessing the wireless communication network the wireless device may transmit an access request on a physical random-access channel (PRACH). This channel is used to carry random access preambles used for initiation of a random-access procedure for accessing the radio-network node. The basic structure of a random access preamble comprises a Cyclic Prefix (CP), a sequence and a guard time. Preambles can be constructed in such a way that the processing in a PRACH receiver can utilize the same-length Fast Fourier Transformers (FFT) as for all other Uplink (UL) channels and signals. PRACH sequences may be constructed by repeating a short sequence (n) wherein a length of a short sequence equals a length of an Orthogonal frequency-division multiplexing (OFDM) symbol. Each short sequence may act as the CP for next short sequence, and the short sequence may be constructed by using Zadoff-Chu sequences, see FIG. 1$a$ where a PRACH preamble is constructed with repeated short sequence. In the current 3GPP LTE standard, the Random Access (RA) preamble, also called PRACH preamble or just preamble, is much longer than one OFDM symbols so large FFT is needed at the receiver.

Allocating a certain preamble of the PRACH procedure where a given PRACH preamble is allocated with a static configured preamble length results in a solution that may have a poor performance of the wireless communication network. Using a long preamble results in more received signal energy with a good performance but with a lower capacity. Using a short preamble results in less received signal energy with higher capacity, but with worse performance.

SUMMARY

An object herein is to provide a mechanism that enhances performance of the wireless communication network.

According to embodiments herein the object is achieved by providing a method performed by a radio-network node for handling access to the radio-network node from a wireless device in a wireless communication network. The radio-network node determines one or more preamble configuration parameters indicating a length of a preamble for a PRACH for the wireless device based on one or more signal strength or quality measurements, and/or a load in the wireless communication network. The radio-network node transmits an indication of the determined one or more preamble configuration parameters to the wireless device.

According to embodiments herein the object is achieved by providing a method performed by a wireless device for handling access to a radio-network node in a wireless communication network. The wireless device receives from the radio-network node, an indication of one or more preamble configuration parameters indicating a length of a preamble for a PRACH for the wireless device to use when performing a random-access procedure to the radio-network node. The wireless device initiates the random-access procedure using a preamble with a length based on the received indication of the one or more preamble configuration parameters.

According to further embodiments herein the object is achieved by providing a radio-network node for handling access to the radio-network node from a wireless device in the wireless communication network. The radio-network node is configured to determine one or more preamble configuration parameters indicating a length of a preamble for a PRACH for the wireless device based on one or more signal strength or quality measurements, and/or a load in the wireless communication network. The radio-network node is further configured to transmit an indication of the determined one or more preamble configuration parameters to the wireless device.

According to further embodiments herein the object is achieved by providing a wireless device for handling access to a radio-network node in a wireless communication network. The wireless device is configured to receive from the radio-network node, an indication of one or more preamble configuration parameters indicating a length of a preamble for a PRACH for the wireless device to use when performing a random-access procedure to the radio-network node; and to initiate the random-access procedure using a preamble with a length based on the received indication of the one or more preamble configuration parameters.

It is furthermore provided herein a computer program comprising instructions, which, when executed on at least one processor, cause the at least one processor to carry out any of the methods above, as performed by the radio-network node or the wireless device. It is additionally provided herein a computer-readable storage medium, having stored thereon a computer program comprising instructions which, when executed on at least one processor, cause the at least one processor to carry out the method according to any of the methods above, as performed by the radio-network node or the wireless device.

Embodiments herein provide a flexible manner of handling access procedure to the radio-network node. By letting the length of the preamble be determined by load, and/or UL/DL/RS measurements the length is determined dynamically resulting in an efficient manner of handling access procedure and leading to an improved performance of the wireless communication network.

BRIEF DESCRIPTION OF THE DRAWINGS

Embodiments will now be described in more detail in relation to the enclosed drawings, in which:

FIG. 11 is a block diagram depicting a wireless device according to embodiments herein.

DETAILED DESCRIPTION

Figure 1A:
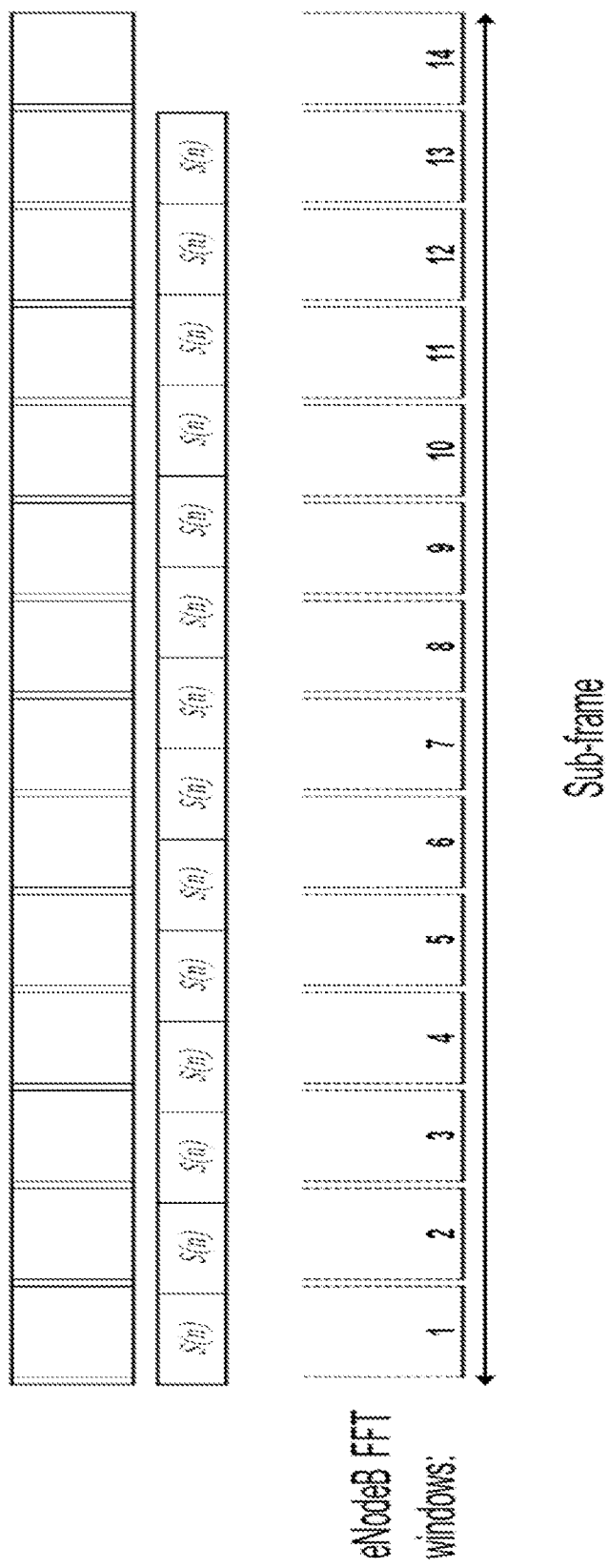
FIG. 1a is a block diagram depicting a PRACH preamble with repeated short sequence.
Figure 1B:
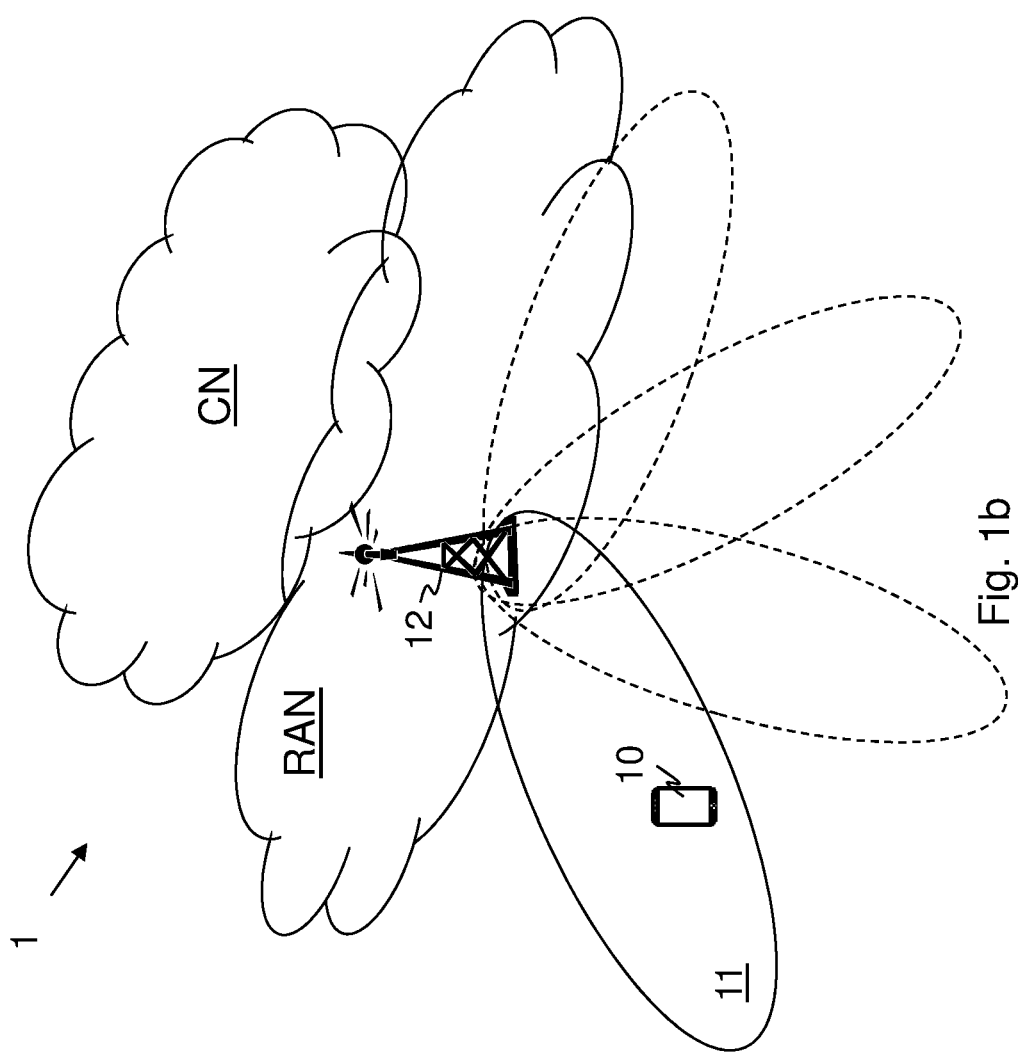
FIG. 1b is an overview depicting a wireless communication network according to embodiments herein.

Embodiments herein relate to wireless communication networks in general. FIG. 1b is a schematic overview depicting a wireless communication network 1. The wireless communication network 1 comprises one or more RANs and one or more CNs. The wireless communication network 1 may use a number of different technologies, such as Wi-Fi, LTE, LTE-Advanced, 5G, WCDMA, GSM/enhanced Data rate for GSM Evolution (EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 1, wireless devices e.g. a wireless device 10 such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The wireless communication network 1 comprises a radio-network node 12 providing radio coverage over a geographical area, a service area 11, which may also be referred to as a beam or a beam group, of a first radio access technology (RAT), such as 5G, LTE, Wi-Fi or similar. The radio-network node 12 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the radio network node 12 depending e.g. on the first radio access technology and terminology used. The radio-network node 12 may be referred to as a serving radio-network node and communicates with the wireless device 10 with Downlink (DL) transmissions to the wireless device 10 and Uplink (UL) transmissions from the wireless device 10.

According to embodiments herein the wireless device 10 performs a random-access procedure using a preamble over the PRACH of flexible length. Thus, a more dynamic access procedure is enabled adapted based on load and signal conditions leading to an improved performance of the wireless communication network.

Figure 2:
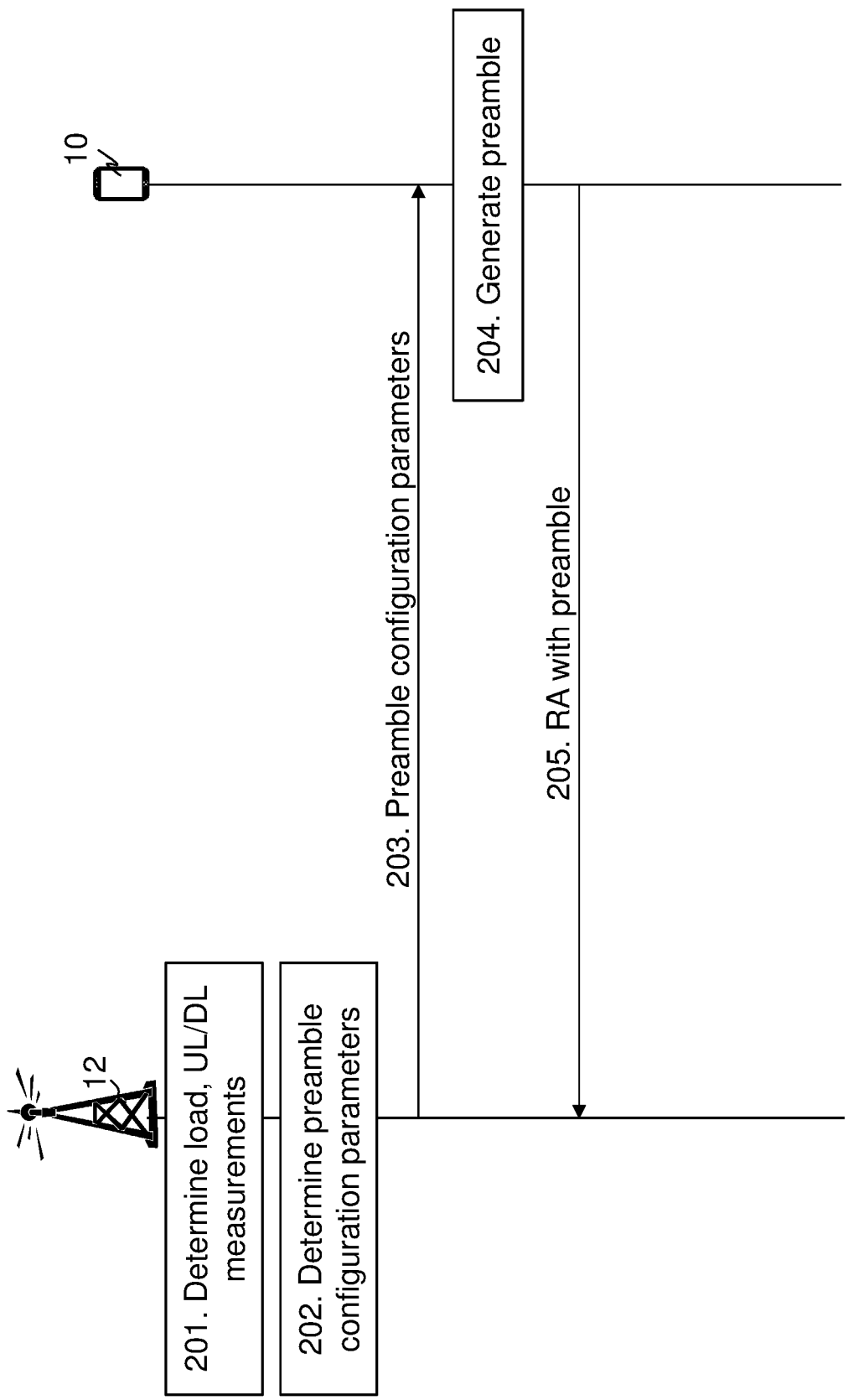
FIG. 2 is a combined flowchart and signalling scheme according to embodiments herein.

FIG. 2 is a combined flowchart and signaling scheme according to some embodiments herein. Actions may be performed in any suitable order.

Action 201. The radio-network node 12 may determine a load on PRACH resources in the wireless communication network, e.g. based on subscribers, signal quality and/or strength, UL/DL measurements e.g. based on received measurement reports and/or measurements performed.

Action 202. The radio-network node 12 determines one or more preamble configuration parameters based on the determined load and/or UL/DL measurements.

Action 203. The radio-network node 12 transmits indication of the determined one or more preamble configuration parameters to the wireless device 10.

Action 204. The wireless device 10 generates a preamble for a random-access procedure based on the received preamble configuration parameters.

Action 205. The wireless device 10 performs the random-access procedure using the generated preamble.

Figure 3:
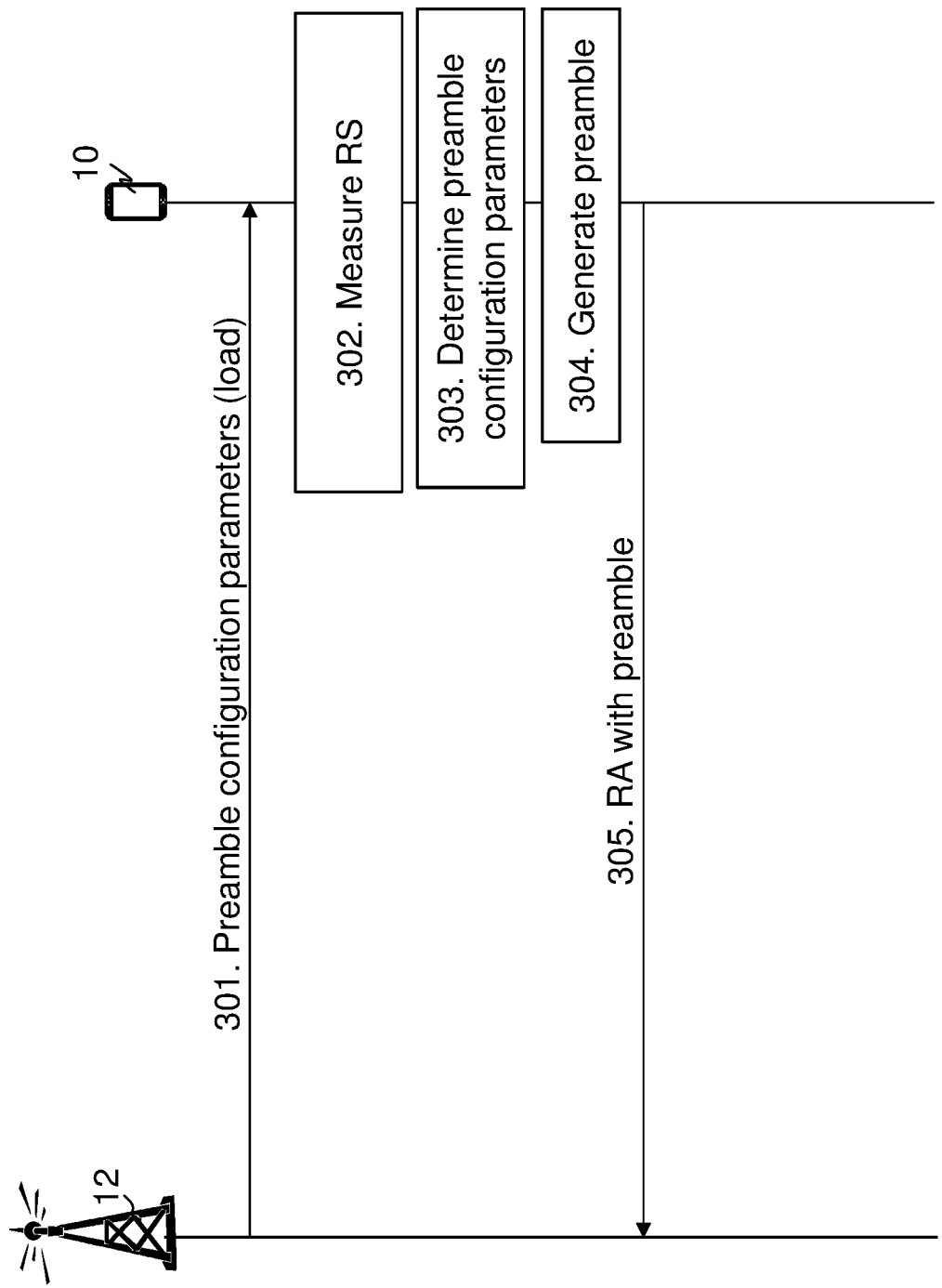
FIG. 3 is a combined flowchart and signalling scheme according to embodiments herein.

FIG. 3 is a combined flowchart and signaling scheme according to some embodiments herein. Actions may be performed in any suitable order.

Action 301. The radio-network node 12 transmits a configuration for preambles of random access, e.g. the preamble configuration parameters, and optionally a current system load on PRACH resources to the wireless device 10. This may be signalling by dedicated signalling such as Radio Resource Control (RRC) or Downlink Control Information (DCI) if the wireless device 10 is connected to the radio-network node 12 or broadcasted as system information if the wireless device 10 is not connected to the radio-network node 12, e.g. where no DL dedicated channel exist or the radio-network node 12 is not aware of the wireless device 10.

Action 302. The wireless device 10 measures a downlink reference signal (RS) power.

Action 303. The wireless device 10 determines preamble configuration parameters based on e.g. the RS measurement and may also take load signaled from the radio-network node 12 into account.

Action 304. The wireless device generates and/or selects a preamble for the random access based the preamble configuration parameters. E.g. repeat a short sequence within a specified time window.

Action 305. The wireless device 10 performs a random-access procedure with the generated preamble.

Figure 4:
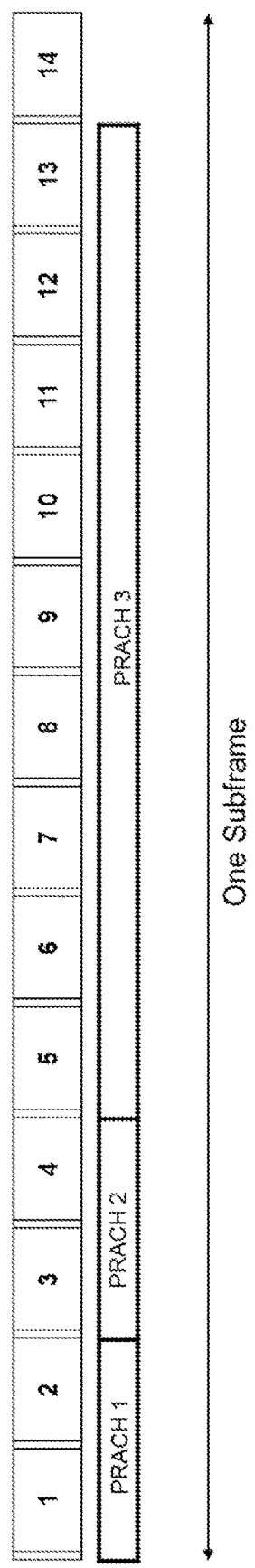
FIG. 4 is a block diagram depicting preambles of different length and start symbols.

FIG. 4 is a block diagram depicting a preamble of flexible length over PRACH. Flexible PRACH preamble length. This flexible length of a PRACH preamble may be configured by system information broadcasted or dedicated signaled by the radio network node 12. For example in PRACH subframe 1 (see FIG. 4), 3 preambles are configured: 2 (Symbol 1-2), 2 (symbol 3-4), 9 (symbol 5-13).

In a PRACH subframe, first symbol of the PRACH preamble and preamble length is configurable. This means that several PRACH preambles can be time multiplexed in the same PRACH subframe, and existing multiplexing methods can be applied to each PRACH resource defined by a specific time window, e.g. multiple root sequences and/or multiple frequency resources can be configured in each time window. Furthermore, independent construction of the preamble sequence in each time window is possible.

The flexible length of the PRACH preamble may be configured by Radio Resource Control (RRC) message or Downlink Control Information (DCI). Thus, the radio-network node 12 may schedule preamble length based on expected preamble received power and/or system load. E.g. estimate the received preamble power based on DL and/or UL measurement when the wireless device 10 is connected to a 5G eNB, or for Initial access to 5G eNB with LTE dual connectivity, the wireless device can report 5G downlink reference signal power via LTE eNB.

Figure 5:
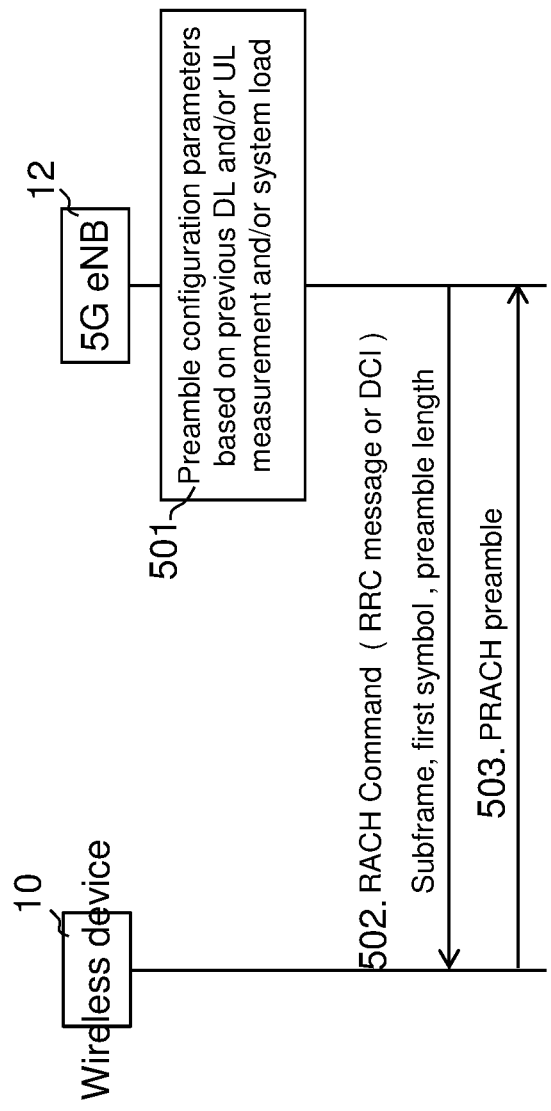
FIG. 5 is a combined flowchart and signalling scheme according to embodiments herein.

FIG. 5 is a flowchart depicting some embodiments herein. Actions may be performed in any suitable order.

Action 501. The radio-network node, e.g. a 5G eNB, determines preamble configuration parameters based on previous DL and/or UL measurements and/or system load.

Action 502. The radio-network node 12 transmits a random-access channel (RACH) command in e.g. RRC message or DCI, to the wireless device 10. The preamble configuration parameters comprise indication of preamble length and may further comprise PRACH subframe configuration, sequence configuration, PRACH frequency resource, and/or first symbol.

Action 503. The wireless device 10 then performs a random-access procedure using the PRACH preamble based on the received preamble configuration parameters.

Figure 6:
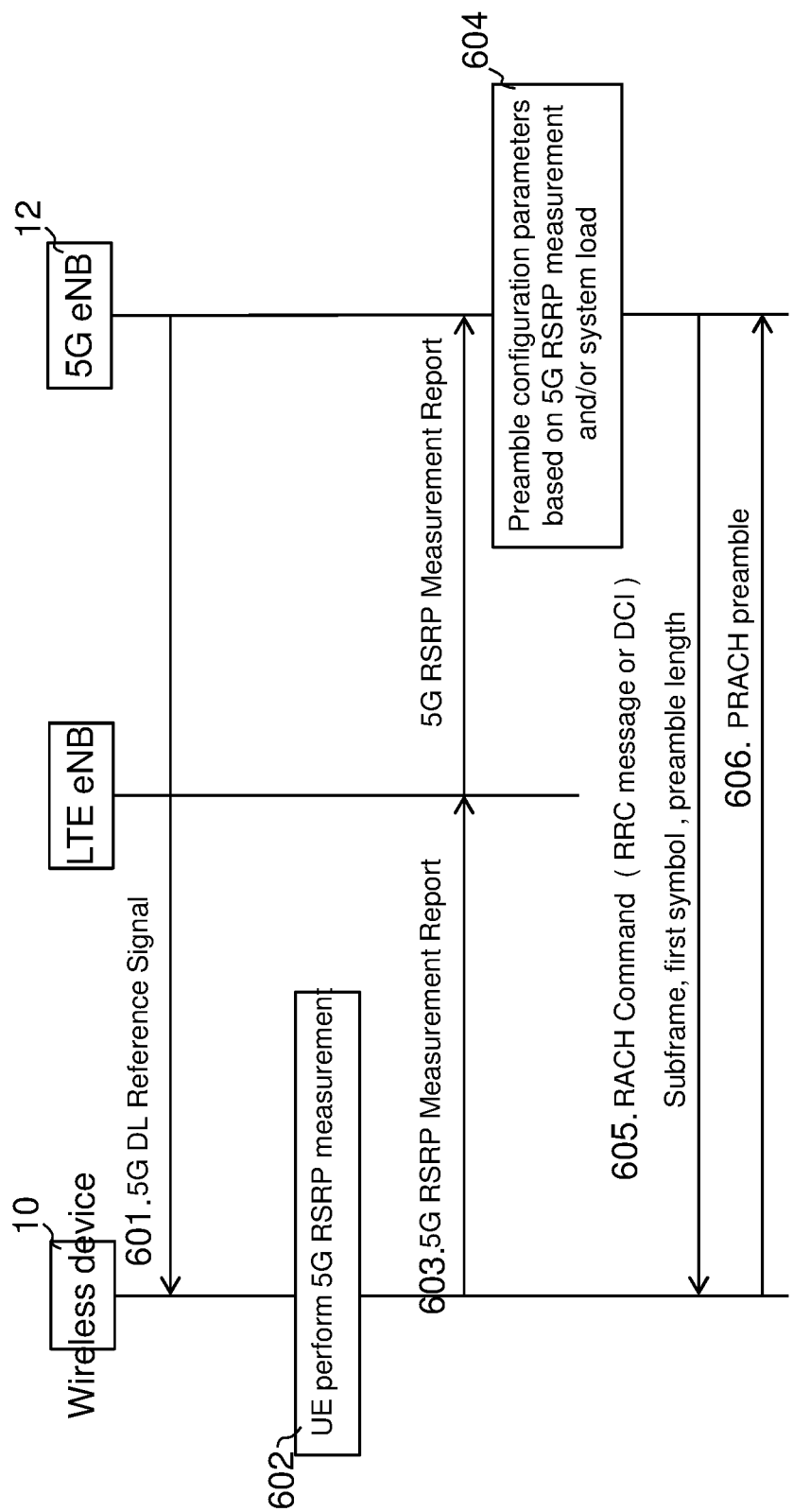
FIG. 6 is a combined flowchart and signalling scheme according to embodiments herein.

FIG. 6 is a flowchart depicting some embodiments herein being in LTE dual connectivity. Actions may be performed in any suitable order.

Action 601. The radio-network node 12 transmits a reference signal e.g. 5G DL reference signal.

Action 602. The wireless device 10 measures on the 5G DL reference signal from the radio-network node 12.

Action 603. The wireless device 10 may then report the measurement in e.g. 5G Reference Signal Received Power (RSRP) measurement report via a radio-network node providing one connectivity out of the dual connectivity.

Action 604. The radio-network node, e.g. a 5G eNB, determines preamble configuration parameters based on received measurement report and/or system load.

Action 605. The radio-network node 12 transmits a random-access channel (RACH) command in e.g. RRC message or DCI, to the wireless device 10 via LTE or 5G radio-network. The preamble configuration parameters comprises indication of preamble length and may further comprise PRACH subframe configuration, sequence configuration, PRACH frequency resources, and/or first symbol.

Action 606. The wireless device 10 then performs a random-access procedure using the PRACH preamble based on the received preamble configuration parameters.

Figure 7:
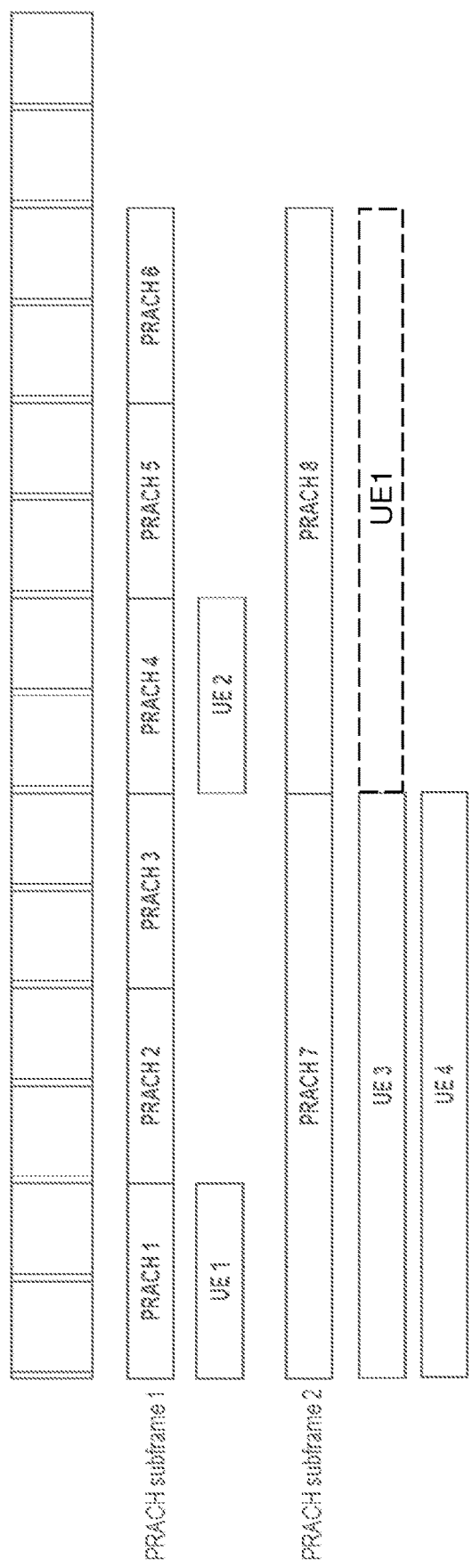
FIG. 7 is a block diagram depicting preambles of different length and start symbols.

FIG. 7 is describing a solution where a first symbol and a preamble length is selected by the wireless device 10. The first symbol of the preamble may be selected by the wireless device 10 randomly or based on identity of the wireless device 10 such as Radio-network Temporary Identifier (RNTI) or similar. The wireless device 10 may select preamble length based on downlink reference signal power, or start with a short preamble with less collision probability and if no response is received from the radio-network node 12, the wireless device 10 may select a long preamble.

The wireless device 10 may receive preamble configuration parameters from the radio-network node 12. For example, the wireless device 10 may receive PRACH subframe configuration in system information, see e.g. FIG. 7 where PRACH subframe 1: 2, 2, 2, 2, 2, 2 sequences and PRACH subframe 2: 6, 6 sequences. Different wireless devices, UEs, may select time windows of different lengths for the preambles of the PRACH. For example, UE1 and UE2 selects preambles with lengths of two OFDM symbols, e.g. two repeated short sequences, but with different start symbols. UE3 and UE4 select preamble lengths of six symbols with the same start symbol.

Figure 8:
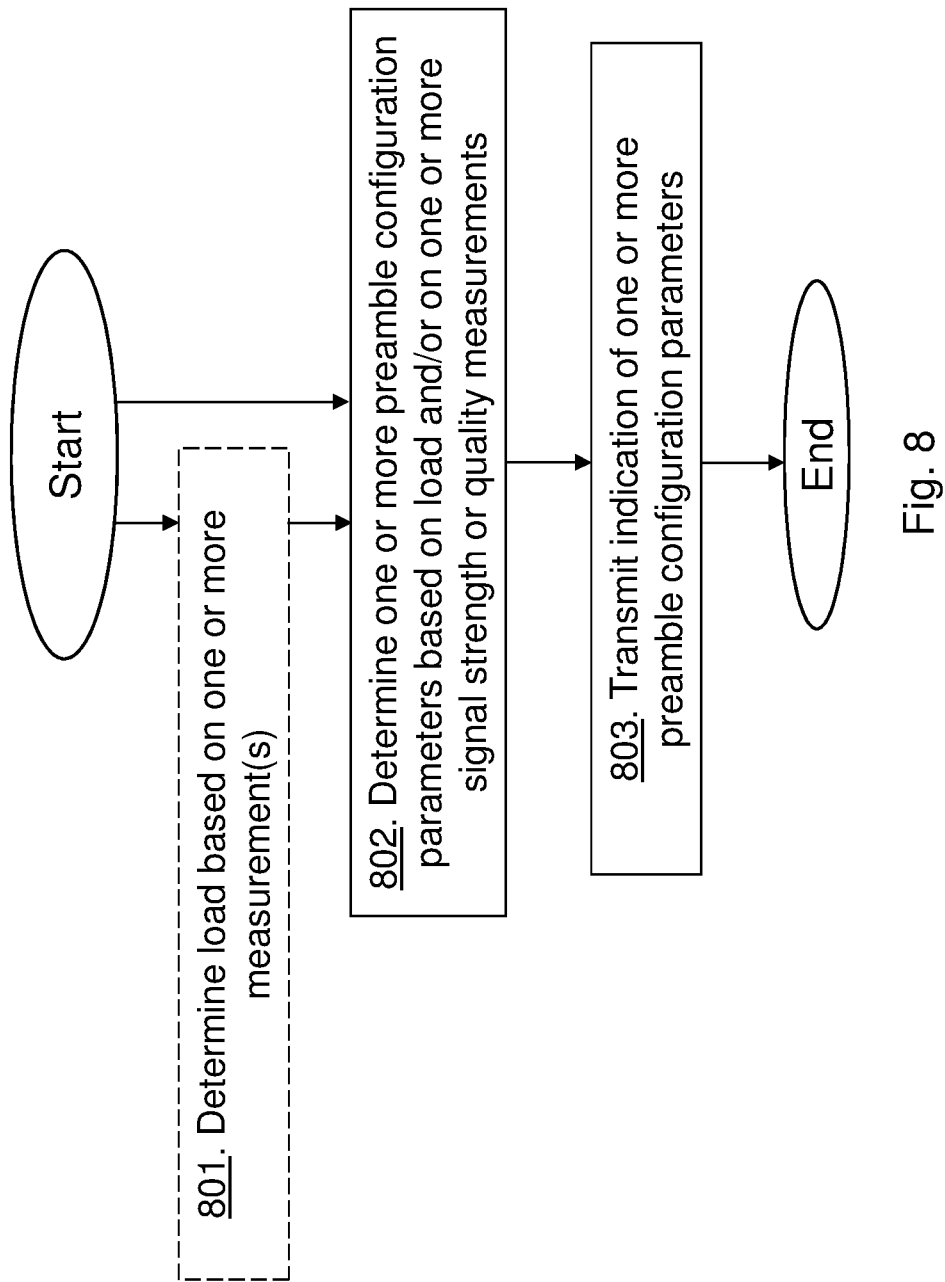
FIG. 8 is a schematic flowchart depicting a method performed by a radio-network node according to embodiments herein.

FIG. 8 is a flowchart depicting a method performed by the radio-network node 12 for handling access to the radio-network node 12 from the wireless device 10 in the wireless communication network 1. Actions may be performed in any suitable order and optional actions are marked as dashed boxes.

Action 801. The radio-network node 12 may determine the load on PRACH resources in the wireless communication network based on one or more received measurement reports and/or measurements performed, which load on PRACH resources indicates the load in the wireless communication network. The radio-network node 12 may determine the load, e.g. based on subscribers, signal quality and/or strength; and the UL/DL measurements e.g. based on received measurement reports and/or measurements performed.

Action 802. The radio-network node 12 determines the one or more preamble configuration parameters indicating the length of the preamble for the PRACH for the wireless device 10 based on the one or more signal strength or quality measurements, and/or the load in the wireless communication network 1. Thus, the radio-network node 12 may determine preamble configuration parameters for setting length of a preamble for a physical random-access channel for the wireless device based on the UL and/or DL measurements, and/or the load in the wireless communication network 1. The one or more preamble configuration parameters may comprise one or more of: PRACH subframe configuration, sequence configuration, PRACH frequency resources, and/or a first symbol.

Action 803. The radio-network node 12 transmits an indication of the determined one or more preamble configuration parameters to the wireless device. For example, the radio-network node 12 may transmit an index indicating one or more preamble configuration parameters or may transmit a value indicating an explicit value for the one or more preamble configuration parameters.

Figure 9:
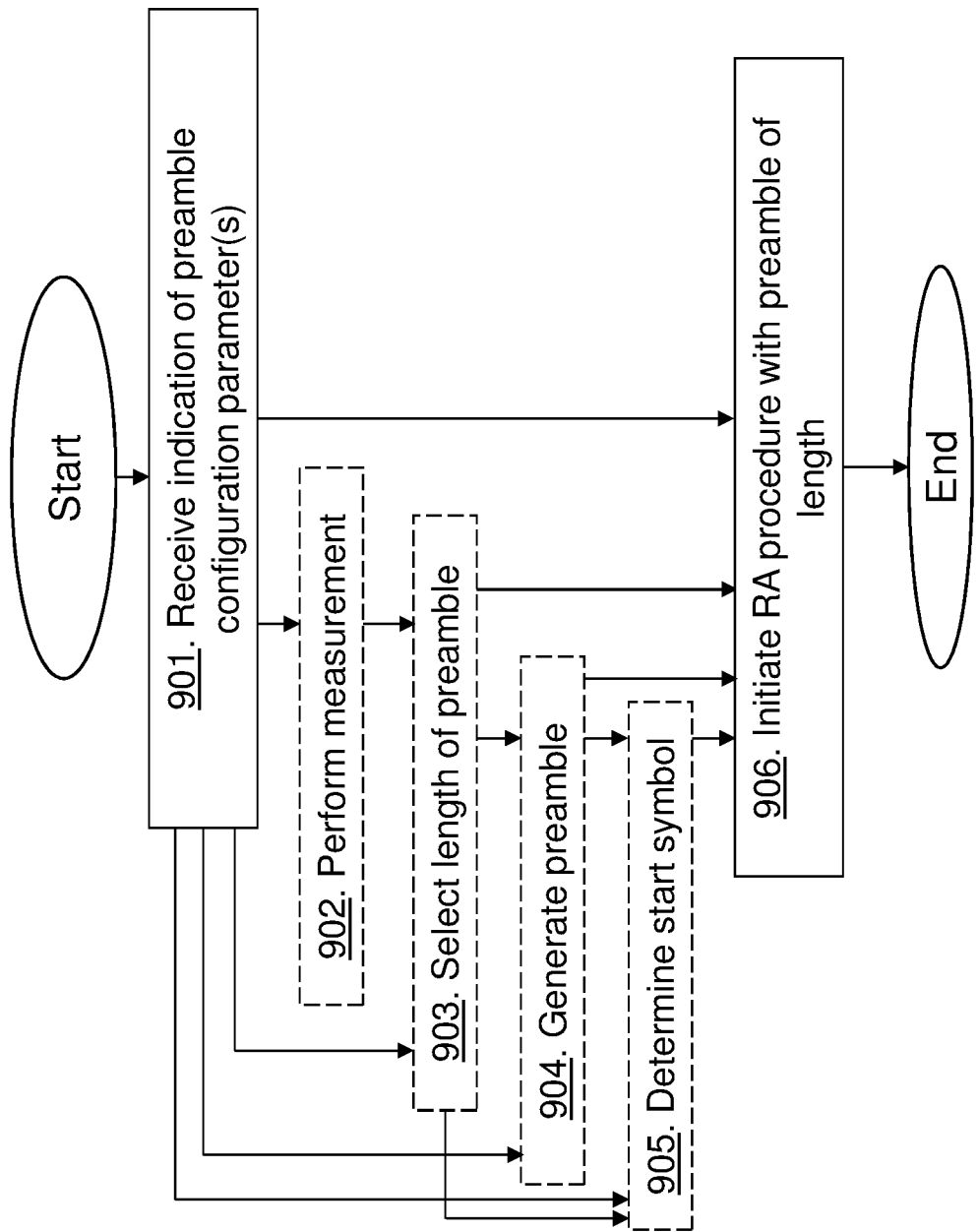
FIG. 9 is a schematic flowchart depicting a method performed by a wireless device according to embodiments herein.

FIG. 9 is a flowchart depicting a method performed by the wireless device 10 for handling access to the radio-network node 12 in the wireless communication network 1. Actions may be performed in any suitable order and optional actions are marked as dashed boxes.

Action 901. The wireless device 10 receives from the radio-network node 12, the indication of one or more preamble configuration parameters indicating the length of the preamble for the PRACH for the wireless device 10 to use when performing the random-access procedure to the radio-network node 12. The wireless device 10 may receive preamble configuration parameters from the radio-network node 12, e.g. indicating allowed lengths of preamble to use when performing a random-access procedure to the radio-network node 12.

Action 902. The wireless device 10 may perform on a received reference signal, a measurement indicating the received reference signal power.

Action 903. The wireless device 10 may select the length of the preamble for the PRACH, based on the received reference signal power and/or the load on PRACH resources and the length indicated by the received indication of the one or more preamble configuration parameters. The wireless device 10 may e.g. select the length of the preamble for the physical random-access channel based on a reference signal measurement e.g. received reference signal power and allowed preamble length indicated by the radio-network node 12.

Action 904. The wireless device 10 may generate the preamble of the length with repeated short sequences. For example, the wireless device 10 may generate the preamble, with repeated short sequences, of the selected length.

Action 905. The wireless device 10 may determine a start symbol of the preamble based on the length of the preamble. The start symbol indicated from the radio-network node 12 is part of the configuration and thus limits the available PRACH resources for the wireless device 10. However, based on the preamble length that the wireless device 10 has chosen (e.g. based on signal-strength measurements) the actual start symbol utilized by the wireless device 10 may be a later one.

Action 906. The wireless device 10 initiates the random-access procedure using a preamble with a length based on the received indication of the one or more preamble configuration parameters. The wireless device 10 may initiate the random-access procedure using a preamble with the selected length. The wireless device 10 may initiate the random-access procedure using the determined start symbol.

Figure 10:
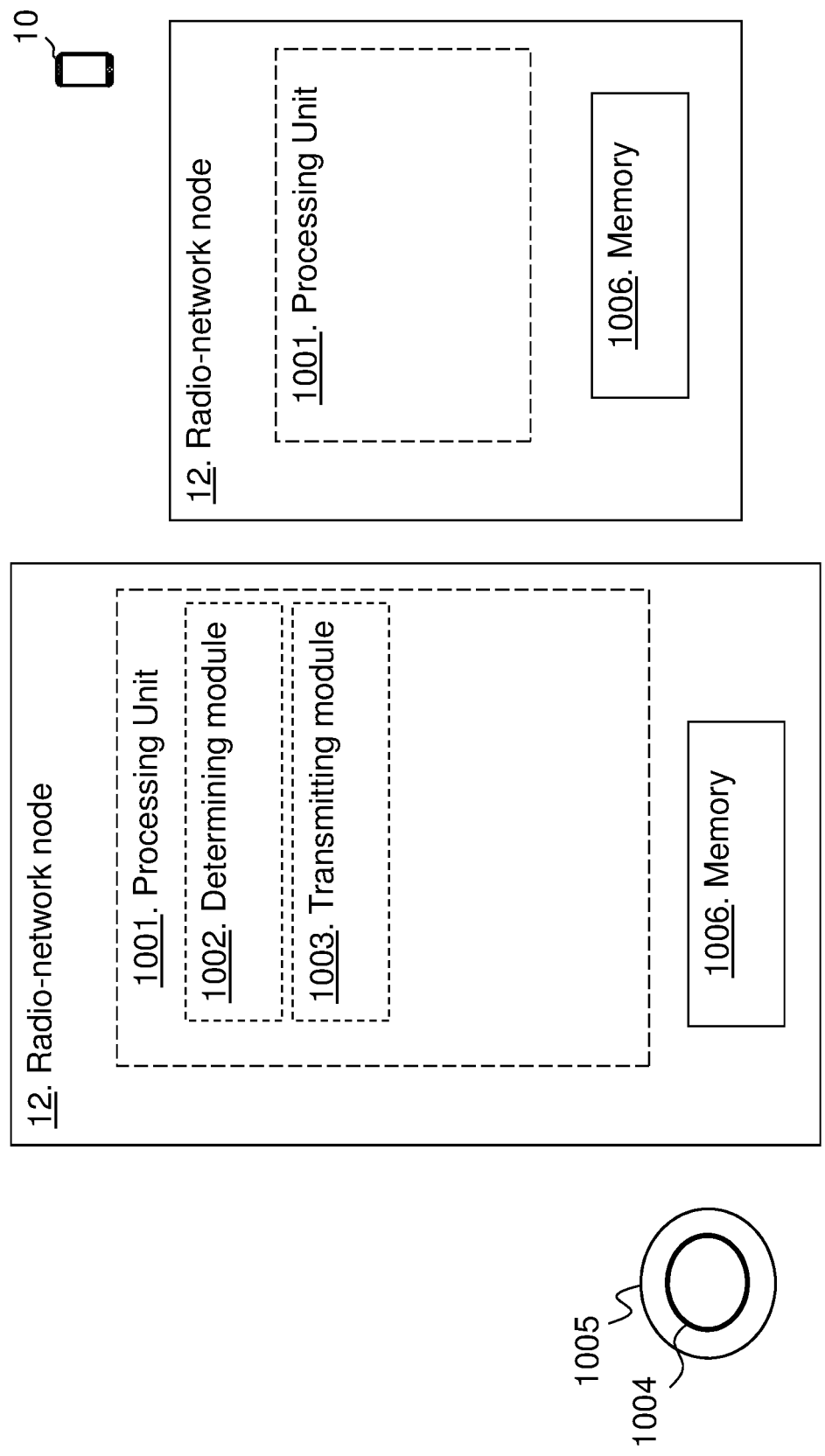
FIG. 10 is a block diagram depicting a radio-network node according to embodiments herein.

FIG. 10 is a block diagram depicting the radio-network node 12, in two embodiments, for handling access to the radio-network node 12 from the wireless device 10 in the wireless communication network 1.

The radio-network node 12 may comprise a processing unit 1001, e.g. one or more processors, configured to perform the methods herein.

The radio-network node 12 may comprise a determining module 1002. The radio-network node 12, the processing unit 1001 and/or the determining module 1002 may be configured to determine the load on PRACH resources in the wireless communication network 1 based on one or more received measurement reports and/or measurements performed, which load on PRACH resources indicates the load in the wireless communication network. For example, based on subscribers, signal quality and/or strength; and the UL/DL measurements e.g. based on received measurement reports and/or measurements performed.

The radio-network node 12, the processing unit 1001 and/or the determining module 1002 is configured to determine one or more preamble configuration parameters indicating the length of the preamble for the PRACH for the wireless device 10 based on one or more signal strength or quality measurements, and/or the load in the wireless communication network 1. The radio-network node 12, the processing unit 1001 and/or the determining module 1002 may be configured to determine one or more preamble configuration parameters for setting length of a preamble for a physical random-access channel for the wireless device based on the UL and/or DL measurements, and/or the load in the wireless communication network 1. The one or more preamble configuration parameters may comprise one or more of: PRACH subframe configuration, sequence configuration, PRACH frequency resources, and/or a first symbol or start symbol.

The radio-network node 12 may comprise a transmitting module 1003, e.g. a transmitter or transceiver. The radio-network node 12, the processing unit 1001 and/or the transmitting module 1003 is configured to transmit the indication of the determined one or more preamble configuration parameters to the wireless device 10.

The methods according to the embodiments described herein for the radio-network node 12 are respectively implemented by means of e.g. a computer program 1004 or a computer program product, comprising instructions, i.e., software code portions, which, when executed on at least one processor, cause the at least one processor to carry out the actions described herein, as performed by the radio-network node 12. The computer program 1004 may be stored on a computer-readable storage medium 1005, e.g. a disc or similar. The computer-readable storage medium 1005, having stored thereon the computer program, may comprise the instructions which, when executed on at least one processor, cause the at least one processor to carry out the actions described herein, as performed by the radio-network node 12. In some embodiments, the computer-readable storage medium may be a non-transitory computer-readable storage medium.

The radio-network node 12 further comprises a memory 1006. The memory comprises one or more units to be used to store data on, such as lengths of preambles, resources, loads, measurements, start symbols, applications to perform the methods disclosed herein when being executed, and similar. Thus, the radio-network node 12 for handling access to the radio-network node 12 from the wireless device 10 in the wireless communication network may herein be provided wherein the memory 1006 contains instructions executable by said processing unit 1001 whereby the radio-network node 12 is operative to perform the methods herein.

FIG. 11 is a block diagram depicting the wireless device 10, in two embodiments, for handling access to the radio-network node 12 in the wireless communication network 1.

The wireless device 10 may comprise a processing unit 1101, e.g. one or more processors, configured to perform the methods herein.

The wireless device 10 may comprise a receiving module 1102, e.g. a receiver or transceiver. The wireless device 10, the processing unit 1101 and/or the receiving module 1102 is configured to receive from the radio-network node 12, the indication of the one or more preamble configuration parameters indicating the length of the preamble for the PRACH for the wireless device 10 to use when performing the random-access procedure to the radio-network node. Thus the wireless device 10 may receive preamble configuration parameters from the radio-network node 12, e.g. indicating allowed lengths of preamble to use when performing a random-access procedure to the radio-network node 12.

The wireless device 10 may comprise a selecting module 1103. The wireless device 10, the processing unit 1101 and/or the selecting module 1103 may be configured to select the length of the preamble for the PRACH, based on the received reference signal power and/or the load on PRACH resources and the length indicated by the received indication of the one or more preamble configuration parameters. The wireless device may select the length of the preamble for the physical random-access channel based on the reference signal measurement(s), e.g. received reference signal power of performed measurements or received measurement reports, and allowed preamble length indicated by the radio-network node 12.

The wireless device 10 may comprise a generating module 1104. The wireless device 10, the processing unit 1101 and/or the generating module 1104 may be configured to generate the preamble of the length with repeated short sequences or generate the preamble, with repeated short sequences, of the selected length.

The wireless device 10 may comprise an accessing module 1105. The wireless device 10, the processing unit 1101 and/or the accessing module 1105 is configured to initiate the random-access procedure using a preamble with a length based on the received indication of the one or more preamble configuration parameters, e.g. initiate the random-access procedure using a preamble with the selected length. The wireless device 10, the processing unit 1101 and/or the accessing module 1105 may be configured to determine the start symbol of the preamble based on the length of the preamble, and to initiate the random-access procedure using the determined start symbol.

The wireless device 10 may comprise a performing module 1106. The wireless device 10, the processing unit 1101 and/or the performing module 1106 may be configured to perform, on a received reference signal, a measurement indicating the received reference signal power.

The methods according to the embodiments described herein for the wireless device 10 are respectively implemented by means of e.g. a computer program 1107 or a computer program product, comprising instructions, i.e., software code portions, which, when executed on at least one processor, cause the at least one processor to carry out the actions described herein, as performed by the wireless device 10. The computer program 1107 may be stored on a computer-readable storage medium 1108, e.g. a disc or similar. The computer-readable storage medium 1108, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

The wireless device 10 further comprises a memory 1109. The memory comprises one or more units to be used to store data on, such as lengths of preambles, resources, loads, measurements, start symbols, applications to perform the methods disclosed herein when being executed, and similar. Thus, the wireless device 10 for handling access to the radio-network node 12 in the wireless communication network may herein be provided wherein the memory 1109 contains instructions executable by said processing unit 1101 whereby the wireless device 10 is operative to perform the methods herein.

As will be readily understood by those familiar with communications design, that function means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio-network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio-network nodes will appreciate the cost, performance, and maintenance trade-offs inherent in these design choices.

Embodiments herein disclose a method performed by a radio-network node for handling access to the radio-network node from a wireless device in a wireless communication network. The radio-network node determines one or more preamble configuration parameters for setting length of a preamble for a physical random-access channel for the wireless device based on UL and/or DL measurements, and/or a load in the wireless communication network. The radio-network node further transmits the determined one or more preamble configuration parameters to the wireless device.

Further embodiments disclose a method performed by a wireless device for handling access to a radio-network node in a wireless communication network. The wireless device selects a length of a preamble for a physical random-access channel based on received reference signal power and allowed preamble length indicated by the radio-network node, and the wireless device initiates a random-access procedure using a preamble with the selected length.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a radio network node in a wireless communication network, the method comprising:
dynamically configuring Physical Random Access Channels (PRACHs) over recurring PRACH subframes, at least in terms of configured PRACH preamble lengths, based on at least one of a changing load on associated PRACH resources and changing signal conditions measured by or reported to the radio network node for a service area of the wireless communication network corresponding to the associated PRACH resources; and
transmitting configuration information indicating the configured PRACHs for respective ones of the recurring PRACH subframes;
wherein the PRACHs configured for each of the recurring PRACH subframes represent a scheduled time-multiplexing arrangement of PRACHs of configured PRACH preamble lengths and corresponding starting positions within the PRACH subframe.

2. The method according to claim 1, further comprising determining the changing load on the associated PRACH resources based on a received-power estimate for PRACH reception, as estimated from one or more of downlink signal measurement reports received by the radio network node or uplink signal measurements performed by the radio network node.

3. The method according to claim 1, further comprising the radio network node dynamically changing one or more further PRACH parameters in addition to the configured PRACH preamble lengths, as a function of the changing load and/or the changing signal conditions, the one or more further PRACH parameters including one or more of: a preamble sequence configuration, PRACH frequency resources, and a first symbol of a preamble sequence.

4. A method performed by a wireless device operating in a wireless communication network, the method comprising:
receiving configuration information from a radio network node, indicating a scheduled time-multiplexing arrangement of Physical Random Access Channels (PRACHs) within a corresponding PRACH subframe, each PRACH having a configured PRACH preamble length and a corresponding starting position within the PRACH subframe, the PRACHs being available for the wireless device to use when performing a random access procedure to the radio network node;
selecting one of the PRACHs on the basis of the configured PRACH preamble lengths, in dependence on signal conditions at the wireless device relative to the radio network node; and
initiating the random access procedure using the selected PRACH.

5. The method according to claim 4, further comprising determining the signal conditions at the wireless device based on a received reference signal power determined at the wireless device for a reference signal transmitted by the radio network node.

6. The method according to claim 4, further comprising generating the preamble for the selected PRACH, with repeated short sequences.

7. The method according to claim 4, further comprising:
determining a start symbol of the preamble for the selected PRACH, based on the configured PRACH preamble length; and
initiating the random access procedure using the determined start symbol.

8. A non-transitory computer-readable storage medium, having stored thereon a computer program comprising instructions that, when executed on at least one processor of a radio network node, cause the radio network node to:
dynamically configure Physical Random Access Channels (PRACHs) over recurring PRACH subframes, at least in terms of configured PRACH preamble lengths, based on at least one of a changing load on associated PRACH resources and changing signal conditions measured by or reported to the radio network node for a service area of the wireless communication network corresponding to the associated PRACH resources; and transmit configuration information indicating the configured PRACHs for respective ones of the recurring PRACH subframes;

wherein the PRACHs configured for each of the recurring PRACH subframes represent a scheduled time-multiplexing arrangement of PRACHs of configured PRACH preamble lengths and corresponding starting positions within the PRACH subframe.

9. A non-transitory computer-readable storage medium, having stored thereon a computer program comprising instructions that, when executed on at least one processor of a wireless device, cause the wireless device to:

receive configuration information from a radio network node in a wireless communication network, indicating a scheduled time-multiplexing arrangement of Physical Random Access Channels (PRACHs) within a corresponding PRACH subframe, each PRACH having a configured PRACH preamble length and a corresponding starting position within the PRACH subframe, the PRACHs being available for the wireless device to use when performing a random access procedure to the radio network node;

select one of the PRACHs on the basis of the configured PRACH preamble lengths, in dependence on signal conditions at the wireless device relative to the radio network node; and initiate the random access procedure using the selected PRACH.

10. A radio-network node configured for operation in a wireless communication network, the radio network node comprising:

communication circuitry configured for communicating with wireless devices operating in a service area associated with the radio network node; and processing circuitry operatively associated with the communication circuitry and configured to:

dynamically configure Physical Random Access Channels (PRACHs) over recurring PRACH subframes, at least in terms of configured PRACH preamble lengths, based on at least one of a changing load on associated PRACH resources and changing signal conditions measured by or reported to the radio network node for a service area of the wireless communication network corresponding to the associated PRACH resources; and transmit configuration information indicating the configured PRACHs for respective ones of the recurring PRACH subframes;

wherein the PRACHs configured for each of the recurring PRACH subframes represent a scheduled time-multiplexing arrangement of PRACHs of configured PRACH preamble lengths and corresponding starting positions within the PRACH subframe.

11. The radio-network node according to claim 10, wherein the processing circuitry is configured to determine the changing load on the associated PRACH resources based on a received-power estimate for PRACH reception, as estimated from one or more of downlink signal measurement reports received by the radio network node or uplink signal measurements performed by the radio network node.

12. The radio-network node according to claim 10, wherein the processing circuitry is further configured to dynamically change one or more further PRACH parameters in addition to the PRACH preamble lengths, as a function of the changing load and/or the changing signal conditions, the one or more further PRACH parameters comprising one or more of: a preamble sequence configuration, PRACH frequency resources and a first symbol of a preamble sequence.

13. A wireless device configured for operation in a wireless communication network, the wireless device comprising:

communication circuitry configured for communicating with a radio network node in the wireless communication network; and processing circuitry operatively associated with the communication circuitry and configured to:

receive configuration information from the radio network node, indicating a scheduled time-multiplexing arrangement of Physical Random Access Channels (PRACHs) within a corresponding PRACH subframe, each PRACH having a configured PRACH preamble length and a corresponding starting position within the PRACH subframe, the PRACHs being available for the wireless device to use when performing a random access procedure to the radio network node;

select one of the PRACHs on the basis of the configured PRACH preamble lengths, in dependence on signal conditions at the wireless device relative to the radio network node; and initiate the random access procedure using the selected PRACH.

14. The wireless device according to claim 13, wherein the processing circuitry is configured to determine the signal conditions at the wireless device based on a received reference signal power determined at the wireless device for a reference signal transmitted by the radio network node.

15. The wireless device according to claim 13, wherein the processing circuitry is configured to generate the preamble for the selected PRACH, with repeated short sequences.

16. The wireless device according to claim 13, wherein the processing circuitry is configured to:

determine a start symbol of the preamble for the selected PRACH based on the configured PRACH preamble length; and initiate the random access procedure using the determined start symbol.

17. The method of claim 1, wherein the step of dynamically configuring the PRACHs comprises, for a given PRACH subframe, configuring the PRACH preamble lengths as a function of a corresponding estimate of loading on the associated PRACH resources.

18. The method of claim 1, wherein the step of dynamically configuring the PRACHs comprises, for a given PRACH subframe, configuring the PRACH preamble lengths as a function of signal conditions reported from one or more wireless devices operating in the service area.

19. The radio network node of claim 10, wherein the processing circuitry is configured to dynamically configure the PRACHs by, for a given PRACH subframe, configuring the PRACH preamble lengths as a function of a corresponding estimate of loading on the associated PRACH resources.

20. The radio network node of claim 10, wherein the processing circuitry is configured to dynamically configure the PRACHs by, for a given PRACH subframe, configuring the PRACH preamble lengths as a function of signal conditions reported from one or more wireless devices operating in the service area.

* * * * *